United States Patent
Schultz

[19]

[11] Patent Number: 6,101,871
[45] Date of Patent: Aug. 15, 2000

[54] IN-GROUND VAPOR MONITORING DEVICE AND METHOD

[75] Inventor: A. K. Schultz, Bellaire, Mich.

[73] Assignee: Sandra K. Myers, Bellaire, Mich.

[21] Appl. No.: 08/395,698

[22] Filed: Feb. 28, 1995

[51] Int. Cl.[7] .................................................. E21B 49/08
[52] U.S. Cl. .................................. 73/152.25; 73/864.11; 166/264
[58] Field of Search .......................... 73/151, 152, 153, 73/155, 864.11, 864.14, 864.15, 864.21, 864.24, 864.34; 166/264

[56] References Cited

U.S. PATENT DOCUMENTS

| | | | |
|---|---|---|---|
| 2,141,261 | 12/1938 | Clark | 166/264 |
| 2,153,254 | 4/1939 | Johnston et al. | 166/264 |
| 2,190,250 | 2/1940 | Blackburn | 166/264 |
| 2,946,565 | 7/1960 | Williams | 166/264 |
| 3,343,421 | 9/1967 | Miller | 73/864.34 |
| 3,685,347 | 8/1972 | Hildebrant et al. | 73/35.16 |
| 3,857,289 | 12/1974 | Wise et al. | 73/864.43 |
| 4,295,801 | 10/1981 | Bennett | 73/864.34 |
| 5,031,697 | 7/1991 | Wellington et al. | 73/155 |
| 5,042,297 | 8/1991 | Lessi | 73/155 |
| 5,046,568 | 9/1991 | Cordry | 73/155 |
| 5,070,949 | 12/1991 | Gavignet | 73/155 |
| 5,207,096 | 5/1993 | Castel et al. | 73/151 |
| 5,303,582 | 4/1994 | Miska | 73/155 |
| 5,337,838 | 8/1994 | Sorensen | 73/155 |
| 5,351,534 | 10/1994 | Lessi | 73/155 |
| 5,355,739 | 10/1994 | Cooper et al. | 73/864.34 |

*Primary Examiner*—George Dombroske
*Attorney, Agent, or Firm*—Douglas S. Bishop

[57] ABSTRACT

In an in-ground vapor monitoring device for use with a conventional, hollow stemmed drill rig including a novel swivel assembly which attaches to a drill rod and which has a central passage formed therethrough. A fluid outlet port and an outlet channel joining the outlet port and central passage are formed in the swivel assembly. The device further includes an auger having an inlet port formed on its operational end which is connected by an inlet channel to a central passage. A vapor filter is disposed in the inlet channel. By applying an external vacuum source, vapor from a borehole is drawn off through the inlet port and filtered by the vapor filter. A gas chromatograph or other vapor analyzer is connected to the outlet port to analyze the drawn off vapors. The novel features of the auger portion of the device may be provided in the form of an auger plug engageable with a conventional auger.

13 Claims, 2 Drawing Sheets

IN-GROUND VAPOR MONITORING DEVICE AND METHOD

FIELD OF THE INVENTION

This invention relates to the field of drilling operations using a drilling rig including a hollow stem auger and drill rod and, more particularly, to such a drill rig in which in ground vapors may be drawn up by an external vacuum source for subsequent analysis.

BACKGROUND OF THE INVENTION

A variety of prior art methods and systems are known for sampling the liquids and gasses generated during drilling operations and, especially, exploratory drilling. Furthermore some of these prior art systems employ vacuum assist. For example, U.S. Pat. No. 2,112,845 describes an aspirator for drawing gas from the bottom of a borehole. U.S. Pat. No. 2,374,227 teaches positioning a vacuum bottle which is opened to collect a sample. U.S. Pat. No. 3,685,645 describes a fluid-circulating process for sampling the fluid in the soil around a borehole in which plugs or packets are promptly inserted in freshly drilled boreholes and are arranged to permit a stock fluid of known concentration to be circulated into repetitive contact with the soil exposed by the borehole. The concentration of the soil gas components are then measured when they have attained a substantially equilibrium concentration in the fluid being recirculated. However, such prior art methods have suffered from inconsistency. Consistency is particularly difficult to attain because relatively low concentrations of significant fluids such as hydrocarbons are present in the air or water present in the soil around the borehole.

U.S. Pat. No. 3,857,289 proposes a method of soil sampling using the auger, itself. The method includes using a telescoping auger that has extendable, internal conduits. The auger has teeth and flightlings arranged to form a substantially cylindrical borehole without causing any significant regrinding of soil particles. Auger rotation is stopped, and soil laden flightlings are moved away from the bottom of the borehole. The auger includes a pair of conduits which are then opened into fluid communication with the space between the auger flightlings and the borehole bottom. Fluid containing relatively small and known amounts of the component to be measured is circulated through the conduits and the exposed portions of the borehole and a measuring device in order to entrain and measure at least one component of the fluid in the soil around the borehole. While the method disclosed in the '289 patent is said to permit fluid sampling without allowing atmospheric contamination, it does require a determination of auger rotation and the moving away of the flightlings from the bottom of the borehole so as to open the conduits. Obviously having to stop the auger rotation each time a sampling is made is highly undesirable to efficient operation. Just as obviously, then having to remove the auger from the borehole after each sampling is also highly undesirable.

It would be desirable to provide a device for and a method of in-ground vapor monitoring which can be performed during operation of the auger and on a continuous basis, if desired.

It would be further desirable to provide such a device and method which is achieved by the use of modular drilling components which may be retrofitted onto existing drilling rigs.

SUMMARY OF THE INVENTION

The present invention has been designed to overcome the shortcomings in the prior art noted above. It is a device for and method of in-ground vapor monitoring which may be performed while drilling is occurring. The invention may be used in connection with a standard drilling rig including a hollow stem auger or drill rod and drill string. The device includes a novel swivel assembly which connects the drill rod to the drill string. The swivel assembly includes a swivel body having a central swivel passage formed therethrough. An outlet port is formed in the swivel body and opens out onto the surface thereof for connection to a vapor analyzer such as standard gas chromatograph. An outlet channel is formed in the swivel body and connects the outlet port and the central swivel passage for fluid communication therebetween.

The device also includes an auger having a central auger passage formed there through and including an inlet port formed in the operational end of the auger and opening out onto the surface thereof. An inlet channel is formed in the auger for connecting the inlet port and the central auger passage for fluid communication therebetween. A vapor filter is disposed in the inlet channel proximate the inlet port to filter the vapors drawn up by an external vacuum source.

In one preferred embodiment of the device of the present invention, the inlet port, inlet channel, and filter are disposed in an auger plug which is insertable into the end of a standard hollow stem auger. In this way, the device of the present invention can be retrofit onto existing equipment. In another preferred embodiment, the inlet port and inlet channel are formed within the auger body, itself. In both cases, the auger includes a plurality of auger bits and flights formed on the outer surface thereof for cutting the soil and forming a borehole there through.

When the device is connected to an external vacuum source, vapors are drawn up through the inlet port of the auger and passed through the vapor filter. They are then drawn up through the inlet channel the central passage of the auger, drill rod, and swivel, and subsequently out the outlet channel and outlet port. By placing the outlet port in fluid communication with the vapor analyzer (such as a gas chromatography, the sampled vapor may be analyzed, and such analysis may be performed while drilling operations are occurring, and even on a continuous basis.

BRIEF DESCRIPTION OF THE DRAWINGS

The following detailed description is best understood by reference to the following drawings which.

DETAILED DESCRIPTION OF THE PREFERRED EMBODIMENT

Figure 1:
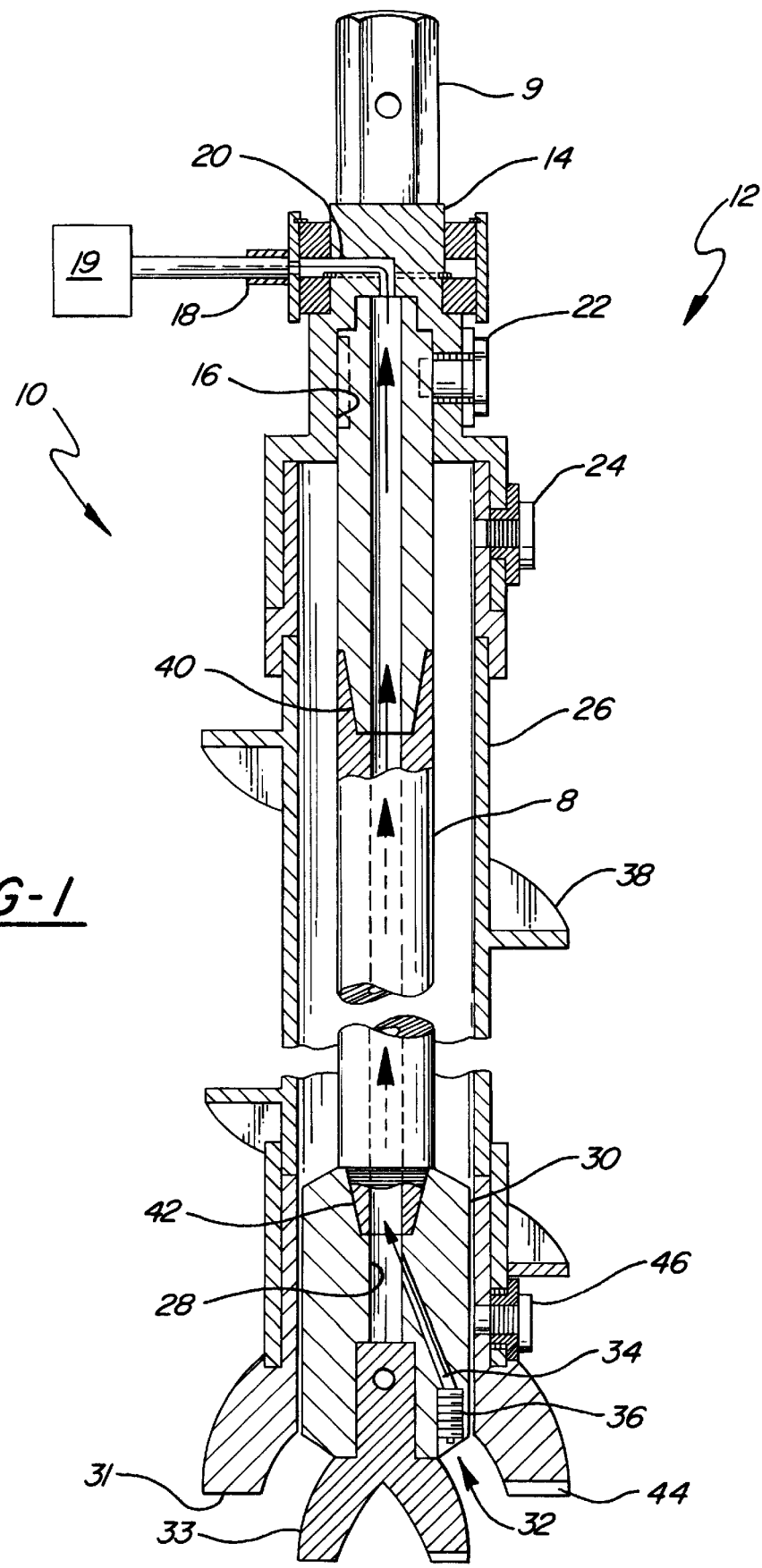
FIG. 1 is a schematic view of the device of the present invention attached to the drilling rig with certain portions thereof shown in cross section.

Throughout the following detailed description, like numerals are used to reference the same element of the present invention shown in multiple figures thereof. Referring now to the drawings, and in particular to FIG. 1, there is shown an in-ground vapor monitoring device 10 for use with a drilling rig including a drill rod 8 and a drill string 9. The device 10 includes a novel swivel assembly 12 including a swivel body 14 having a central swivel passage 16 formed therethrough. The swivel passage 16 is in fluid communication with an outlet port 18 formed in the swivel body 14 and communicating with the surface thereof. Outlet channel 20 connects swivel passage 16 to outlet port 18 to form a means of fluid communication. The outlet port 18 may be placed in fluid communication with a vapor analyzer, such as gas chromatograph shown schematically as block 19. The swivel assembly 12 further includes a threaded end 40 which is engageable with conventional drill rod 8. First and second connectors 22, 24 in the form of lock bolts are provided on swivel body 14 to lock the swivel assembly 12 to, respectively, the drill rod 8 and auger 26.

Auger 26 also includes a central auger passage 28 formed therethrough. It is to be understood that, as depicted in FIG. 1, less than the entirety of auger 26 is shown with portions thereof being cut away. In reality, auger 26 would extend longitudely for a considerably greater distance than is depicted. Disposed around auger 26 are conventional auger flights 38 so that a drill rig equipped with auger 26 may be used to drill a circular borehole.

Auger 26 includes a threaded end 42 and a novel plug 30. Auger plug 30 is configured to have a continuation of central auger passage 28 formed therethrough. Disposed at an operational end 44 of auger plug 30 is inlet port 32. Auger plug 30 is held in place by drill rod 8. Furthermore, a second bit 33 is disposed at the operational end 44 of auger plug 30.

Inlet channel 34 connects inlet port 32 and central auger passage 28 to place them in a fluid communication. Thus, a continuous fluid passageway is formed between inlet port 32 and outlet port 18 by, successively, inlet channel 34, central auger passage 28, drill rod 8, central swivel passage 16, and outlet channel 20. Thus by connecting outlet port 18 to an external vacuum source (not depicted), vapors contained in a borehole in which the drill rig is operating will be drawn up through the enumerated structures in the direction shown by the arrows.

A vapor filter 36 is disposed in inlet channel 34 proximate inlet port 32. Preferably, the vapor filter 32 is self clearing and serves to prevent the ingress of solid particles.

Figure 2:
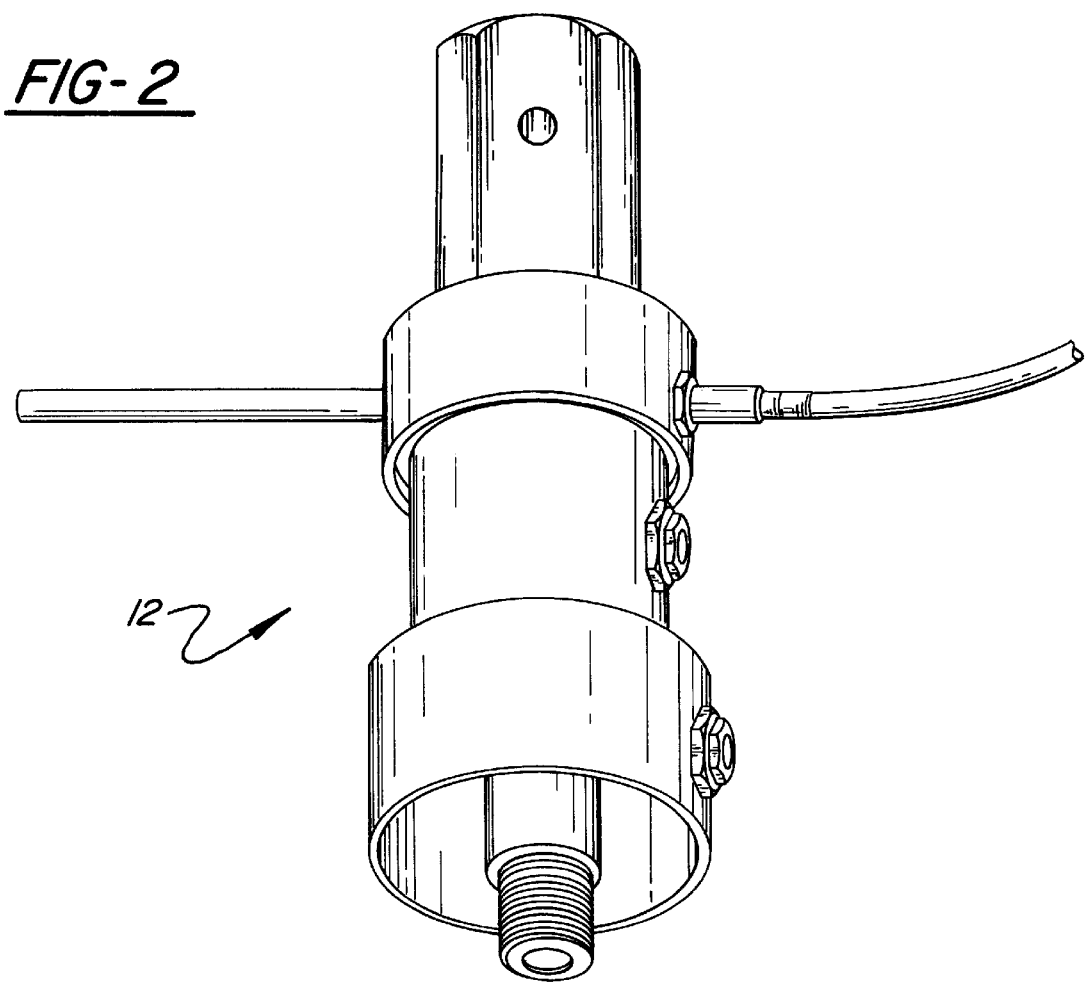
FIG. 2 is a perspective view of a swivel assembly suitable for use in practicing the present invention.
Figure 3:
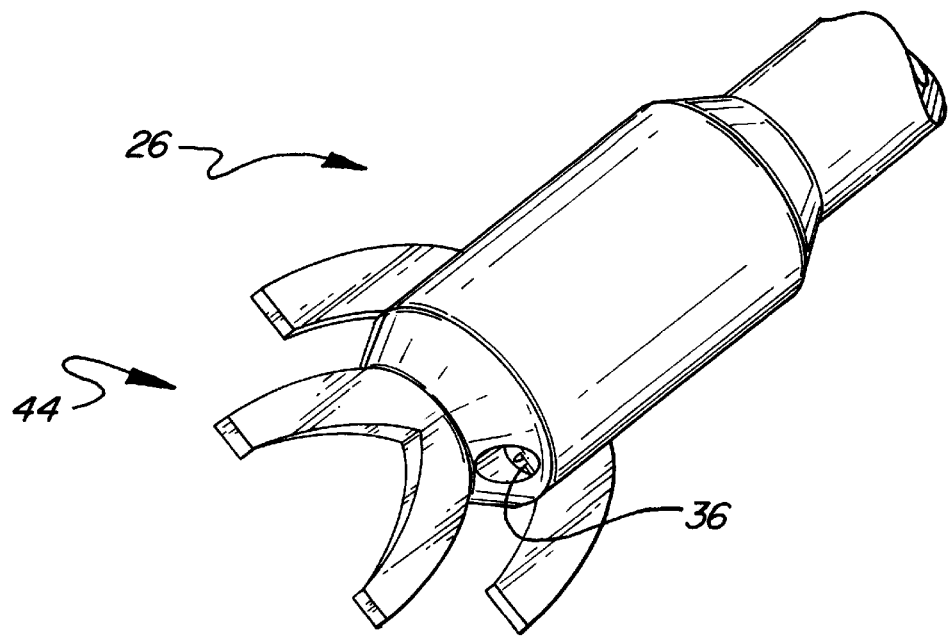
FIG. 3 is a perspective view of an auger embodying the concepts of the present invention.

FIGS. 2 and 3 depict, respectively, the novel swivel assembly 12 of the present invention and an auger 26 employing the principles of the present invention disassembled from the drill rod and drill string. FIG. 3 clearly shows the inlet port 32 disposed at the operational end 44 of auger 26 with the filter 36 in place therein. Because both the swivel and auger include conventional threaded fixtures for attachment to standard drill rods and drill strings, the device of the present invention is one which can be used with standard drilling equipment, a tremendous advantage over prior art systems which require additional special fittings.

In the embodiment shown in FIG. 1, the auger 26 is provided with auger plug 30. Auger plug 30 includes all the novel features of the inlet port 32, inlet channel 34 and filter 36 according to the present invention. Thus, instead of being supplied as an entire auger, this component of the device of the present invention may be provided as a threaded auger plug which can then be connected to a known and conventional auger. In this way, the device of the present invention can be retro fitted onto existing equipment, thus creating another great saving in cost.

The device of the present invention may be used to practice the method of the invention while drilling is occurring and the drill rig is rotating within a borehole. As long as an external vacuum source is applied, vapors will be continuously drawn up through the components of the device and will be analyzed by an analyzer such as a gas chromatograph. Thus, samplings may be done as often as desired, or even on a continuous or intermittent basis without causing any down time necessitated by stopping the drill rig, as is true in some of the prior art systems.

Thus, an in-ground vapor monitoring device and method has been described which includes a novel swivel assembly and an auger having an inlet port and filter disposed therein to permit vapor sampling during drilling operations. Of course, while the device and method have been described with regard to certain exemplifications and embodiments thereof, it is to be understood that one skilled in the art may, having the benefit of the teachings of the present invention, design various modifications and adaptations thereof. For example, the principles of the present invention can be practiced with a wide variety of drill rod designs provided that they include a central passageway. Furthermore, the swivel assembly and auger or auger plug may be configured somewhat differently than those depicted without departing from the scope of the present invention. It is the claims appended hereto, and all reasonable equivalents thereof, which define the true scope of the present invention rather than the depicted embodiments and exemplification.

What is claimed is:

1. An in-ground vapor monitoring device for use with a drilling rig including a hollow stem auger and drill rod, said vapor monitoring device including:
   a swivel assembly including:
      a swivel body having a central passageway formed therethrough;
      an outlet port formed in said swivel body and opening onto the surface thereof for connection to a vapor analyzer; and
      a first outlet channel formed in said swivel body and connecting said outlet port and said central swivel passage for fluid communication therebetween; and
   an auger plug insertable into an end of auger and including;
      an auger plug body having a central auger passage formed therethrough;
      an inlet port formed in an operation end of said auger plug body and opening unto the surface thereof;
      an inlet channel formed in said auger plug body for connecting said inlet port and said central auger passage for fluid communication therebetween; and
      a vapor filter disposed in said inlet channel proximate said inlet port, wherein the in-ground vapors may be continuously drawn up through said inlet port and into said vapor monitoring device.

2. The device of claim 1 wherein the swivel assembly further comprises first and second connectors for connecting said swivel assembly to, respectively, a drill string and said drill rod.

3. The device of claim 2 wherein first and second connectors comprise first and second lock bolts.

4. The device of claim 1 wherein the auger plug further includes an auger bit formed on said operational end of said auger plug.

5. The device of claim 4 wherein the auger plug further comprises a threaded end opposite said operational end for threaded connection with said auger.

6. The device of claim 1 wherein said swivel assembly further comprises a threaded end for connection with said drill rod.

7. The device of claim 1 wherein the vapor analyzer comprises a gas chromatograph.

8. An in-ground vapor monitoring device for use with a drilling rig including hollow stem drill rod, said vapor monitoring device including:
   a swivel assembly including:

a swivel body having a central passageway formed therethrough;

an outlet port formed in said swivel body and opening unto the surface thereof for connection to a vapor analyzer; and a first outlet channel formed in said swivel body and connecting said outlet port and said central swivel passage for fluid communication therebetween; and an auger connected to said drill rod, and including a central auger passage formed therethrough and an auger bit disposed on an outer surface thereof;

an auger plug insertable into an end of said auger and including:

an auger plug body having a central auger passage formed therethrough;

an inlet port formed in an operational end of said auger plug body and opening unto the surface thereof;

an inlet channel formed in said auger plug body for connecting said inlet port and said central auger passage for fluid communication therebetween; and a vapor filter disposed in said outlet channel proximate said inlet port, wherein the in-ground vapors may be continuously drawn up through said inlet port and into said vapor monitoring device.

9. The device of claim 8 wherein the swivel assembly further comprises first and second connectors for connecting said swivel assembly to, respectively, a drill string and said drill rod.

10. The device of claim 8 wherein the auger plug further includes a second auger bit formed on said operational end of said auger plug.

11. The device of claim 8 wherein said swivel assembly further comprises a threaded end for connection with said drill rod.

12. The device of claim 8 wherein the vapor analyzer comprises a gas chromatograph.

13. A method of performing continuous in-ground monitoring of vapors generated during drilling operations performed with a drill rig including a hollow stem auger and drill rod, said method including the steps of:

connecting said drill rig to a drill string using a swivel assembly including:

a swivel body having a central passageway formed therethrough;

an outlet port formed in said swivel body and opening unto the surface thereof for connection to a vapor analyzer; and a first outlet channel formed in said swivel body and connecting said outlet port and said central swivel passage for fluid communication therebetween;

connecting an auger plug to an end of said auger, said auger plug including:

an auger plug body having a central auger passage formed therethrough;

an inlet port formed in an operational end of said auger plug body and opening unto the surface thereof;

an inlet channel formed in said auger plug body for connecting said inlet port and said central auger passage for fluid communication therebetween; and a vapor filter disposed in said outlet channel proximate said inlet port;

connecting said outlet port to an external vacuum source;

operating said drilling rig to generate in-ground vapors;

continuously operating said vacuum source to draw said generated vapors up through the inlet port, vapor filter, inlet channel, drill rig, outlet channel, and outlet port; and continuously passing said drawn up vapors through a gas chromatograph.

* * * * *